(12) United States Patent
Vittorias et al.

(10) Patent No.: US 10,577,490 B2
(45) Date of Patent: *Mar. 3, 2020

(54) POLYETHYLENE COMPOSITION HAVING HIGH MECHANICAL PROPERTIES AND PROCESSABILITY

(71) Applicant: Basell Polyolefine GmbH, Wesseling (DE)

(72) Inventors: Iakovos Vittorias, Mainz (DE); Bernd Lothar Marczinke, Frankfurt (DE); Gerhardus Meier, Frankfurt (DE); Ulf Schüller, Weiterstadt (DE); Andreas Maus, Frankfurt (DE); Harilaos Mavridis, Lebanon, OH (US); Diana Dötsch, Bad Kreuznach (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/739,893

(22) PCT Filed: Jun. 6, 2016

(86) PCT No.: PCT/EP2016/062747
§ 371 (c)(1),
(2) Date: Dec. 26, 2017

(87) PCT Pub. No.: WO2016/206958
PCT Pub. Date: Dec. 29, 2016

(65) Prior Publication Data
US 2018/0362743 A1    Dec. 20, 2018

Related U.S. Application Data

(60) Provisional application No. 62/185,247, filed on Jun. 26, 2015.

(51) Int. Cl.
*C08L 23/06* (2006.01)
*C08F 210/02* (2006.01)
(Continued)

(52) U.S. Cl.
CPC .............. *C08L 23/06* (2013.01); *B32B 27/08* (2013.01); *B32B 27/32* (2013.01); *B32B 27/327* (2013.01);
(Continued)

(58) Field of Classification Search
None
See application file for complete search history.

(56) References Cited

U.S. PATENT DOCUMENTS 8,129,472 B2    3/2012    Turner et al.
9,725,541 B2    8/2017    Meier et al.
(Continued)

FOREIGN PATENT DOCUMENTS

CN    105308114 A    2/2016
CN    105392836 A    3/2016
(Continued)

OTHER PUBLICATIONS

The International Search Report and Written Opinion for PCT/EP2016/062747 dated Jul. 11, 2016.

*Primary Examiner* — Catherine S Branch

(57) ABSTRACT

A polyethylene composition having the following features:
1) density from about 0.945 to about 0.955 g/cm$^3$, determined according to ISO 1183 at 23° C.;
2) ratio MIF/MIP from about 23 to about 40;
3) MIF from about 8.5 to about 18 g/10 min.;
4) HMWcopo index from about 3.5 to about 20; and
5) long-chain branching index, LCBI, equal to or greater than about 0.45.

(Continued)

The polyethylene composition can be used to produce pipes and films.

10 Claims, 1 Drawing Sheet

(51) Int. Cl.
    *C08F 210/14*     (2006.01)
    *C08F 10/02*     (2006.01)
    *C08F 2/34*     (2006.01)
    *C08F 4/654*     (2006.01)
    *C08F 4/659*     (2006.01)
    *B32B 27/32*     (2006.01)
    *B32B 27/08*     (2006.01)
    *F16L 9/12*     (2006.01)

(52) U.S. Cl.
    CPC .............. *C08F 2/34* (2013.01); *C08F 4/6545* (2013.01); *C08F 4/65912* (2013.01); *C08F 4/65916* (2013.01); *C08F 10/02* (2013.01); *C08F 210/02* (2013.01); *C08F 210/14* (2013.01); *B32B 2307/558* (2013.01); *B32B 2307/72* (2013.01); *B32B 2307/732* (2013.01); *B32B 2597/00* (2013.01); *C08F 2500/01* (2013.01); *C08F 2500/07* (2013.01); *C08F 2500/09* (2013.01); *C08F 2500/12* (2013.01); *C08F 2500/17* (2013.01); *C08L 2203/16* (2013.01); *C08L 2203/18* (2013.01); *C08L 2205/025* (2013.01); *C08L 2308/00* (2013.01); *C08L 2314/02* (2013.01); *F16L 9/12* (2013.01)

(56) References Cited

U.S. PATENT DOCUMENTS 9,969,898 B2     5/2018    Meier et al.
2015/0267010 A1     9/2015    Vittorias et al.

FOREIGN PATENT DOCUMENTS

| | | | |
|---|---|---|---|
| EP | 2738211 A1 | 6/2014 | |
| EP | 2738212 A1 | 6/2014 | |
| RU | 2444546 C2 | 3/2012 | |
| WO | WO-2014064060 A1 * | 5/2014 | .......... C08L 23/0815 |
| WO | WO-2014064062 A1 | 5/2014 | |

* cited by examiner

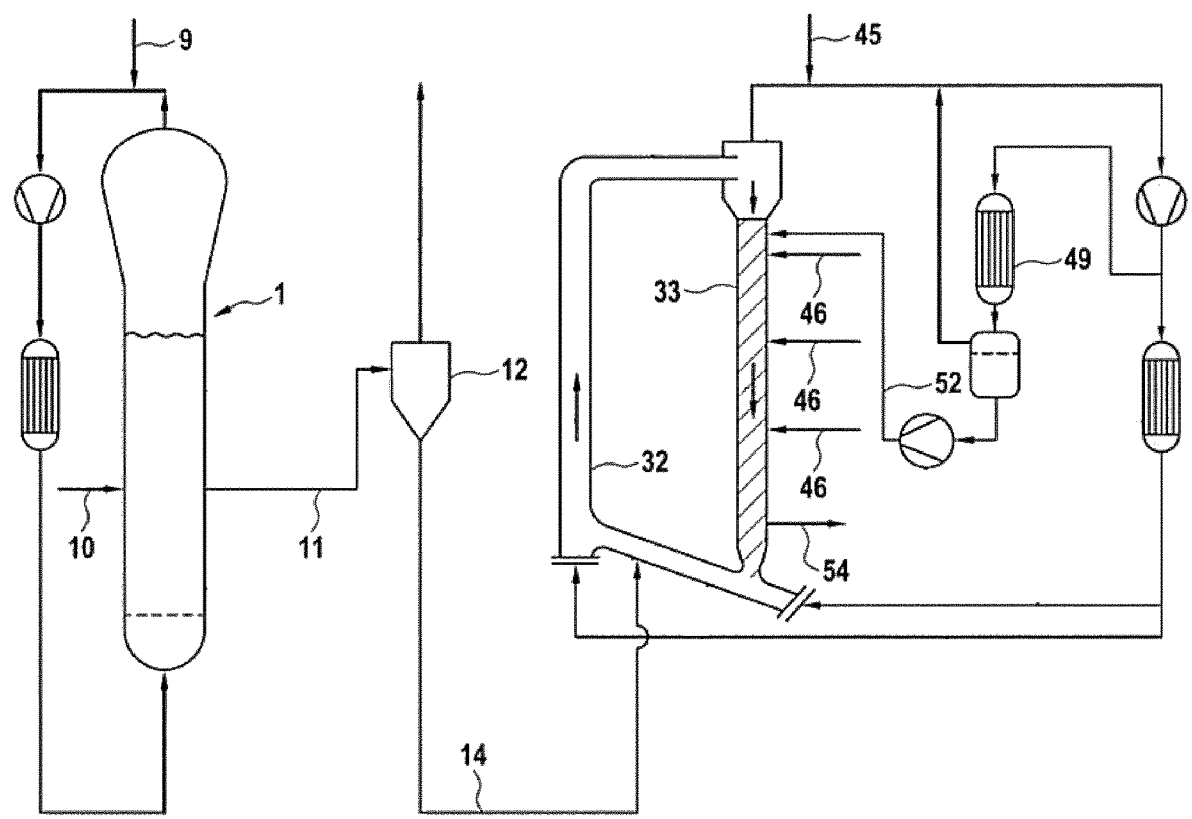

POLYETHYLENE COMPOSITION HAVING HIGH MECHANICAL PROPERTIES AND PROCESSABILITY

This application is the U.S. National Phase of PCT International Application PCT/EP2016/062747, filed Jun. 6, 2016, claiming benefit of priority to U.S. Provisional Patent Application No. 62/185,247, filed Jun. 26, 2015, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure provides a polyethylene composition, articles made therefrom, and a process for preparing the polyethylene composition.

BACKGROUND OF THE INVENTION

Some polyethylene materials can be used for producing pipes, included extruded pipes.

In some instances, polyethylene materials with medium to high density can be designed to obtain a balance of environmental stress cracking resistance (FNCT), impact resistance (Charpy), and processability in the extrusion processes for making extruded articles such as pipes.

SUMMARY OF THE INVENTION

In a general embodiment, the present disclosure provides a polyethylene composition having a molecular weight and the following features:
1) density from about 0.945 to about 0.955 g/cm³, alternatively from about 0.948 to about 0.952 g/cm³, alternatively from about 0.948 to about 0.951 g/cm³ determined according to ISO 1183 at 23° C.;
2) ratio MIF/MIP from about 23 to about 40, alternatively from about 25 to about 38, where MIF is the melt flow index at 190° C. with a load of 21.60 kg, and MIP is the melt flow index at 190° C. with a load of 5 kg, both determined according to ISO 1133;
3) MIF from about 8.5 to about 18 g/10 min., alternatively from about 9 to about 16 g/10 min.;
4) HMWcopo index about 3.5 to about 20, alternatively from about 8 to about 20; and
5) long-chain branching index, LCBI, equal to or greater than about 0.45, alternatively equal to or greater than about 0.65, alternatively from about 0.45 to about 0.85, alternatively from about 0.45 to about 0.84, alternatively from about 0.45 to about 0.83, alternatively from about 0.65 to about 0.85, alternatively from about 0.65 to about 0.84, alternatively from about 0.65 to about 0.83;
wherein the HMWcopo index is determined according to the following formula:

$$\text{HMWcopo} = (\eta_{0.02} \times t_{maxDSC})/(10^5)$$

where
as used herein, the term "$\eta_{0.02}$" is the complex viscosity of a melt in Pa·s, measured at a temperature of 190° C., in a parallel-plate (or plate-plate) rheometer under dynamic oscillatory shear mode with an applied angular frequency of 0.02 rad/s;
as used herein, the term "the $t_{maxDSC}$" is the time, in minutes, to reach the maximum value of heat flow (in mW) of crystallization (time at which the maximum crystallization rate is achieved, equivalent to the t½ crystallization half-time) at a temperature of 124° C. under quiescent conditions, measured in isothermal mode in a differential scanning calorimetry apparatus, DSC; and
as used herein, the term "LCBI" is the ratio of the measured mean-square radius of gyration $R_g$, measured by GPC-MALLS, to the mean-square radius of gyration for a linear PE having a molecular weight equal to about the molecular weight of the polyethylene composition. In some embodiments, the molecular weight is 1,000,000 g/mol.

In some embodiments, the MIP values for the polyethylene compositions range from about 0.20 to about 0.78 g/10 min.

BRIEF DESCRIPTION OF THE DRAWINGS

The present disclosure may be better understood with reference to the following description and accompanying FIGURE where: FIG. 1 is a drawing of a simplified process-flow diagram of two serially connected gas-phase reactors for use in ethylene polymerization processes and for producing a polyethylene composition.

The various embodiments of the present disclosure are not limited to the arrangements and instrumentality shown in the FIGURE.

DETAILED DESCRIPTION OF THE INVENTION

As used herein, the expression "polyethylene composition" embraces, as alternatives, both a single ethylene polymer and an ethylene polymer composition. The ethylene polymer composition may be made from or contain two or more ethylene polymer components and called a "bimodal" or "multimodal" polymer. In some embodiments, the ethylene polymer components can have different molecular weights.

In some embodiments, the polyethylene composition can be made from or contain one or more ethylene copolymers.

All the features herein defined, including features 1) to 5), are referred to the ethylene polymer or ethylene polymer composition. The addition of other components can modify one or more of the features.

As used herein, the ratio MIF/MIP provides a rheological measure of molecular weight distribution.

Another measure of the molecular weight distribution is provided by the ratio $M_{w\_MALLS}/M_{n\_GPC}$, where $M_{w\_MALLS}$ is the weight average molar mass measured with MALLS coupled to GPC and $M_{n\_GPC}$ is the number average molar mass, measured by GPC (Gel Permeation Chromatography).

In some embodiments, $M_{w\_MALLS}/M_{n\_GPC}$ values for the polyethylene composition range from about 8 to about 24, alternatively from about 8 to about 18.

In some embodiments, the $M_{w\_MALLS}$ values are equal to or higher than about 200,000 g/mol, alternatively from about 200,000 to about 500,000 g/mol.

In some embodiments, Mz for the polyethylene composition is from about 800,000 to about 3,500,000 g/mol, alternatively from about 850,000 to about 2,500,000 g/mol.

In some embodiments, the polyethylene composition has at least one of the following additional features.

z-average molecular weight Mz equal to or greater than about 1,000,000 g/mol, alternatively from about 1,100,000 to about 1,500,000 g/mol, measured by GPC-MALLS (Gel Permeation Chromatography coupled with Multi-angle laser-light scattering);

comonomer content equal to or less than about 2.5% by weight, alternatively from about 0.8 to about 1.8% by weight, with respect to the total weight of the composition.

In some embodiments, the comonomer or comonomers present in the ethylene copolymers are selected from olefins having formula $CH_2=CHR$ wherein R is an alkyl radical, linear or branched, having from 1 to 10 carbon atoms.

In some embodiments, the olefins having formula $CH_2=CHR$ are propylene, butene-1, pentene-1,4-methyl-pentene-1, hexene-1, octene-1 and decene-1. In some embodiments, the comonomer is hexene-1.

In some embodiments, the composition is made from or contains:

A) about 30 to about 70% by weight, alternatively about 40 to about 65% by weight of an ethylene homopolymer or copolymer with density equal to or greater than about 0.960 g/cm³ and melt flow index MIE at 190° C. with a load of 2.16 kg, according to ISO 1133, of about 50 g/10 min. or higher, alternatively 60 g/10 min. or higher; and B) about 30 to about 70% by weight, alternatively about 35 to about 60% by weight of an ethylene copolymer having a MIE value lower than the MIE value of A), alternatively lower than about 0.5 g/10 min.

In some embodiments, component A is an ethylene homopolymer.

The above percent amounts are given with respect to the total weight of A)+B).

In some embodiments, MIE ranges for component A) are from about 50 to about 110 g/10 min., alternatively from about 50 to about 100 g/10 min., alternatively from about 50 to about 90 g/10 min., alternatively from about 60 to about 110 g/10 min., or alternatively from about 60 to about 100 g/10 min., alternatively from about 60 to about 90 g/10 min.

The polyethylene composition can be used in producing pipes, including by extrusion. The pipes can be monolayer or multilayer, wherein at least one layer is made from or contains the polyethylene composition.

In some embodiments, the polyethylene composition is characterized by the following properties:

FNCT equal to or greater than about 40 hours at 5 MPa, 90° C.; and

Charpy (0° C.) equal to or greater than about 8 kJ/m², alternatively equal to or greater than about 10 kJ/m².

In a general embodiment, the disclosure provides a pipe prepared from the disclosed polyethylene composition. In some embodiments, the pipe is prepared by extrusion. In some embodiments, the pipe is monolayer or multilayer, wherein at least one layer is made from or contains the disclosed polyethylene composition.

In a general embodiment, the disclosure provides a film prepared from the disclosed polyethylene composition. In some embodiments, the film is prepared by extrusion. In some embodiments, the film is monolayer or multilayer, wherein at least one layer is made from or contains the disclosed polyethylene composition.

In a general embodiment, various polymerization processes and catalysts can be used to prepare the polyethylene compositions disclosed herein. In some embodiments, the polyethylene composition can be prepared by a gas phase polymerization process in the presence of a Ziegler-Natta catalyst.

In some embodiments, a Ziegler-Natta catalyst is made from or contains a product of the reaction of an organometallic compound of group 1, 2 or 13 of the Periodic Table of elements with a transition metal compound of groups 4 to 10 of the Periodic Table of Elements (new notation). In some embodiments, the transition metal compound can be selected among compounds of Ti, V, Zr, Cr and Hf. In some embodiments, the transition metal compound is supported on $MgCl_2$.

In some embodiments, catalysts are made from or contain the product of the reaction of the organometallic compound of group 1, 2 or 13 of the Periodic Table of elements, with a solid catalyst component made from or containing a Ti compound supported on $MgCl_2$.

In some embodiments, the organometallic compounds are organo-Al compounds.

In some embodiments, the polyethylene composition is obtainable by using a Ziegler-Natta polymerization catalyst, alternatively a Ziegler-Natta catalyst supported on $MgCl_2$, alternatively a Ziegler-Natta catalyst made from or containing the product of reaction of:

a) a solid catalyst component made from or containing a Ti compound and an electron donor compound ED supported on $MgCl_2$;
b) an organo-Al compound; and optionally
c) an external electron donor compound $ED_{ext}$.

In some embodiments, in component a) the ED/Ti molar ratio ranges from about 1.5 to about 3.5 and the Mg/Ti molar ratio is higher than about 5.5, alternatively from about 6 to about 80.

In some embodiments, the titanium compounds are the tetrahalides or the compounds of formula $TiX_n(OR^1)_{4-n}$, where $0 \leq n \leq 3$, X is halogen and $R^1$ is $C_1$-$C_{10}$ hydrocarbon group. In some embodiments, the halogen is chlorine. In some embodiments, the titanium compound is titanium tetrachloride.

In some embodiments, the ED compound is selected from the group consisting of alcohols, ketones, amines, amides, nitriles, alkoxysilanes, aliphatic ethers, and esters of aliphatic carboxylic acids.

In some embodiments, the ED compound is selected from the group consisting of amides, esters and alkoxysilanes.

In some embodiments, the ED compound is an ester. In some embodiments, the esters are selected from the group consisting of alkyl esters of C1-C20 aliphatic carboxylic acids. In some embodiments, the ester is a C1-C8 alkyl ester of aliphatic mono carboxylic acids such as ethylacetate, methyl formiate, ethylformiate, methylacetate, propylacetate, i-propylacetate, n-butylacetate, i-butylacetate. In some embodiments, the ED compound is an aliphatic ether. In some embodiments, the aliphatic ether is a C2-C20 aliphatic ether, such as tetrahydrofurane (THF) or dioxane.

In the solid catalyst component the $MgCl_2$ is the basic support, even if minor amount of additional carriers can be used. The $MgCl_2$ can be used as such or obtained from Mg compounds used as precursors that can be transformed into $MgCl_2$ by the reaction with halogenating compounds. In some embodiments, the $MgCl_2$ in active form is used.

In some embodiments, the solid catalyst component a) is obtained by first contacting the titanium compound with the $MgCl_2$, or a precursor Mg compound, optionally in the presence of an inert medium, thereby preparing an intermediate product a') containing a titanium compound supported on $MgCl_2$, which intermediate product a') is then contacted with the ED compound which is added to the reaction mixture alone or in a mixture with other compounds in which the ED compound represents the main component, optionally in the presence of an inert medium.

As used herein, the term "main component" means that the ED compound must be the main component in terms of molar amount, with respect to the other possible compounds excluded inert solvents or diluents used to handle the contact mixture. The ED treated product can then be subjected to washings with the proper solvents in order to recover the final product. The treatment with the ED compound desired can be repeated one or more times.

A precursor of $MgCl_2$ can be used as starting Mg compound. In some embodiments, the precursor is selected from compounds having the formula $MgR'_2$ where the R' groups can be independently C1-C20 hydrocarbon groups optionally substituted, OR groups, OCOR groups, chlorine, in which R is a C1-C20 hydrocarbon groups optionally substituted, with the proviso that the R' groups are not simultaneously chlorine. In some embodiments, the precursors are Lewis adducts between $MgCl_2$ and Lewis bases. In some embodiments, the precursors are $MgCl_2 (R''OH)_m$ adducts in which R" groups are C1-C20 hydrocarbon groups, alternatively C1-C10 alkyl groups, and m is from about 0.1 to about 6, alternatively from about 0.5 to about 3 and alternatively from about 0.5 to about 2. In some embodiments, the adducts are obtained by mixing alcohol and $MgCl_2$ in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, methods for the preparation of these spherical adducts are as disclosed in U.S. Pat. Nos. 4,469,648 and 4,399,054 and Patent Cooperation Treaty Publication No. WO98/44009, all three publications incorporated herein by reference. In some embodiments, the method for spherulization is the spray cooling disclosed in U.S. Pat. Nos. 5,100,849 and 4,829,034, both incorporated herein by reference.

In some embodiments, the adducts are $MgCl_2.(EtOH)_m$ adducts in which m is from about 0.15 to about 1.7 obtained subjecting the adducts with a higher alcohol content to a thermal dealcoholation process carried out in nitrogen flow at temperatures between about 50 and about 150° C. until the alcohol content is reduced to the above value. In some embodiments, the process for preparing the adduct is disclosed in European Patent No. EP 395083, incorporated herein by reference.

The dealcoholation can also be carried out chemically by contacting the adduct with compounds capable to react with the alcohol groups.

In some embodiments, these dealcoholated adducts are characterized by a porosity (measured by mercury method) due to pores with radius up to 0.1 µm ranging from about 0.15 to about 2.5 cm³/g, alternatively from about 0.25 to about 1.5 cm³/g.

These adducts are reacted with the $TiX_n(OR^1)_{4-n}$ compound (or possibly mixtures thereof). In some embodiments, the $TiX_n(OR^1)_{4-n}$ compound is titanium tetrachloride. The reaction with the Ti compound can be carried out by suspending the adduct in $TiCl_4$. In one embodiments, the $TiCl_4$ is cold. The mixture is heated up to temperatures ranging from 80-130° C. and kept at this temperature for 0.5-2 hours. The treatment with the titanium compound can be carried out one or more times. In some embodiments, the treatment is repeated twice. In some embodiments, the process can be carried out in the presence of an electron donor compound. In some embodiments and at the end of the process, the solid is recovered by separation of the suspension by settling and removing of the liquid, filtration, and centrifugation. The solid can be subject to washings with solvents. The washings can be carried out with inert hydrocarbon liquids. Alternatively, the washings can be carried out with more polar solvents such as halogenated hydrocarbons.

The intermediate product is then brought into contact with the ED compound under conditions able to fix an amount of the donor on the solid. Due to the high versatility of this method, the amount of donor used can widely vary. In some embodiments, the amount of donor can be used in molar ratio with respect to the Ti content in the intermediate product ranging from about 0.5 to about 20, alternatively from about 1 to about 10. In some embodiments, the contact is carried out in a liquid medium such as a liquid hydrocarbon. The temperature at which the contact takes place can vary depending on the nature of the reagents. In some embodiments, the temperature is in the range from −10° to 150° C., alternatively from 0° to 120° C. Temperatures causing the decomposition or degradation of any specific reagents should be avoided even if the temperatures fall within the range. Also, the duration of the treatment can depend on other conditions such as nature of the reagents, temperature, and concentration. In some embodiments, this contact step can last from about 10 minutes to about 10 hours, alternatively from about 0.5 to about 5 hours. In some embodiments and to further increase the final donor content, this step can be repeated one or more times. In some embodiments and at the end of this step the solid is recovered by separation of the suspension by settling and removing of the liquid, filtration, and centrifugation. The solid can be subject to washings with solvents. The washings can be carried out with inert hydrocarbon liquids. Alternatively, the washings can be carried out with more polar solvents such as halogenated or oxygenated hydrocarbons.

The solid catalyst component is converted into catalysts for the polymerization of olefins by reacting the solid catalyst component with an organometallic compound of group 1, 2 or 13 of the Periodic Table of elements. In some embodiments, the organometallic compound is an Al-alkyl compound.

In some embodiments, the alkyl-Al compound is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound is selected from the group consisting of alkylaluminum halides, alkylaluminum hydrides and alkylaluminum sesquichlorides such as $AlEt_2Cl$ and $Al_2Et_3Cl_3$ optionally in mixture with trialkyl aluminum compounds.

The external electron donor compound $ED_{ext}$ optionally used to prepare the Ziegler-Natta catalysts can be equal to or different from the ED used in the solid catalyst component a). In some embodiments, the external electron donor compound is selected from the group consisting of ethers, esters, amines, ketones, nitriles, silanes and their mixtures. In some embodiments, the external electron donor compound is selected from C2-C20 aliphatic ethers, alternatively cyclic ethers, alternatively cyclic ethers having 3-5 carbon atoms such as tetrahydrofurane and dioxane.

The catalyst can be prepolymerized by producing reduced amounts of polyolefin. In some embodiments, the polyolefin is polypropylene or polyethylene. The prepolymerization can be carried out before adding the electron donor compound ED, thus by subjecting to prepolymerization the intermediate product a'). In some embodiments, the solid catalyst component a) is subjected to prepolymerization.

The amount of prepolymer produced can be up to 500 g per g of intermediate product a') or of component a). In some embodiments, the amount of prepolymer is from about 0.5 to about 20 g per g of intermediate product a').

In some embodiments, the prepolymerization is carried out with the use of a cocatalyst such as organoaluminum compounds that can also be used in combination with an external electron donor compound.

In some embodiments, the prepolymerization is carried out at temperatures from about 0 to about 80° C., alternatively from about 5 to about 70° C., in the liquid or gas phase.

In some embodiments, the intermediate product a') of the catalyst is subjected to prepolymerization.

In some embodiments, the polyethylene composition can be prepared in a process including the following steps, in any mutual order:
a) polymerizing ethylene, optionally together with one or more comonomers, in a first gas-phase reactor in the presence of a first amount of hydrogen;
b) copolymerizing ethylene with one or more comonomers in a second gas-phase reactor in the presence of a second amount of hydrogen less than the first amount of hydrogen in step a);
wherein in at least one of the gas-phase reactors, the growing polymer particles flow upward through a first polymerization zone (riser) under fast fluidization or transport conditions, leave the riser and enter a second polymerization zone (downcomer) through which the polymer particles flow downward under the action of gravity, leave the downcomer and are reintroduced into the riser, thereby establishing a circulation of polymer between the two polymerization zones.

In the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between about 0.5 and about 15 m/s, alternatively between about 0.8 and about 5 m/s. See "D. Geldart, Gas Fluidisation Technology, page 155 et seq., J. Wiley & Sons Ltd., 1986", incorporated herein by reference.

In the second polymerization zone (downcomer), the polymer particles flow under the action of gravity in a densified form which approach the bulk density of the polymer.

The polymer flows vertically down through the downcomer in a plug flow (packed flow mode), limiting the quantities of gas entrained between the polymer particles.

The step a) ethylene polymer has a molecular weight lower than the ethylene copolymer obtained from step b).

In some embodiments, a copolymerization of ethylene to produce a relatively low molecular weight ethylene copolymer (step a) is performed upstream the copolymerization of ethylene to produce a relatively high molecular weight ethylene copolymer (step b). In these embodiments and in step a), a gaseous mixture made from or containing ethylene, hydrogen, comonomer and an inert gas is fed to a first gas-phase reactor, alternatively a gas-phase fluidized bed reactor. The polymerization is carried out in the presence of the Ziegler-Natta catalyst.

Hydrogen is fed in an amount depending on the specific catalyst used to obtain in step a) an ethylene polymer with a melt flow index MIE of about 50 g/10 min. or higher. To obtain the MIE range, in step a) the hydrogen/ethylene molar ratio is from about 1 to about 5, the amount of ethylene monomer being from about 2 to about 20% by volume, alternatively from about 8 to about 15% by volume, based on the total volume of gas present in the polymerization reactor. The remaining portion of the feeding mixture is represented by inert gases and one or more comonomers, if any. Inert gases are selected from nitrogen or saturated hydrocarbons. In some embodiments, the inert gas is propane.

In some embodiments, the operating temperature in the reactor of step a) is between about 50 and about 120° C., alternatively between about 65 and about 100° C., while the operating pressure is between about 0.5 and about 10 MPa, alternatively between about 2.0 and about 3.5 MPa.

In some embodiments, the ethylene polymer obtained in step a) represents from about 30 to about 70% by weight of the total ethylene polymer produced in the overall process, that is, in the first and second serially connected reactors.

The ethylene polymer coming from step a) and the entrained gas are then passed through a solid/gas separation step. The gaseous mixture can be recycled back to the first polymerization reactor while the separated ethylene polymer is fed to the reactor of step b). In some embodiments, the polymer is fed into the second reactor on the connecting part between the downcomer and the riser.

The operating temperature in step b) is in the range of about 65 to about 95° C., and the pressure is in the range of about 1.5 to about 4.0 MPa. When broadening of the molecular weight distribution of the final ethylene polymer is sought, the reactor of step b) can be operated by establishing different conditions of monomers and hydrogen concentration within the riser and the downcomer.

In step b) the gas mixture entraining the polymer particles and coming from the riser can be partially or totally prevented from entering the downcomer, thereby obtaining two different gas composition zones. In some embodiments, the different gas composition zones are achieved by feeding a gas and/or a liquid mixture into the downcomer through a line placed at a point of the downcomer. In some embodiments, the point is in the upper part of the downcomer. In some embodiments, the gas and/or liquid mixture have a composition that is different from that of the gas mixture present in the riser. In some embodiments, the flow of the gas and/or liquid mixture is regulated so that an upward flow of gas counter-current to the flow of the polymer particles is generated and acts as a barrier to the gas mixture entrained among the polymer particles coming from the riser. In some embodiments, the regulation occurs at the top. In some embodiments, the feed has a mixture with low content of hydrogen, thereby producing the higher molecular weight polymer fraction in the downcomer. In some embodiments, one or more comonomers is fed to the downcomer of step b), optionally together with ethylene, propane or other inert gases.

The hydrogen/ethylene molar ratio in the downcomer of step b) is between about 0.005 and about 0.2, the ethylene concentration is from about 0.5 to about 15%, alternatively from about 0.5 to about 10%, by volume, the comonomer concentration is from about 0.2 to about 1.2% by volume, based on the total volume of gas present in the downcomer. The rest is propane or similar inert gases. In some embodiments, a very low molar concentration of hydrogen is present in the downcomer, thereby permitting comonomer to bond to the high molecular weight polyethylene fraction.

The polymer particles coming from the downcomer are reintroduced in the riser of step b).

The polymer particles continue reacting in the absence of additional comonomer being fed to the riser; accordingly, the concentration of comonomer drops to a range of about 0.1 to about 0.8% by volume, based on the total volume of gas present in the riser. In some embodiments, the comonomer content is controlled to obtain the desired density of the final polyethylene. In the riser of step b) the hydrogen/ ethylene molar ratio is in the range of about 0.01 to about 0.5, the ethylene concentration is between about 5 and about 15% by volume based on the total volume of gas present in the riser. The rest is propane or other inert gases.

In some embodiments, the polymerization process proceeds as disclosed in Patent Cooperation Treaty Publication No. WO2005019280, incorporated herein by reference.

EXAMPLES

These Examples are illustrative and not intended to limit the scope of this disclosure in any manner whatsoever.

The following analytical methods are used to characterize the polymer compositions.

Density

Determined according to ISO 1183 at 23° C.

HMWcopo Index

HMWcopo (High Molecular Weight Copolymer) Index is defined by the following formula:

$$HMWcopo = (\eta_{0.02} \times t_{maxDSC})/(10^5)$$

It is also a description and quantification of the amount of high molecular weight fraction, correlating to the melt complex viscosity $\eta_{0.02}$ at the frequency of 0.02 rad/s, and the amount of incorporated comonomer which delays the crystallization, as quantified by the maximum heat flow time for quiescent crystallization, $t_{maxDSC}$. The melt viscosity $\eta_{0.02}$ is determined by a measurement in dynamic oscillatory shear in a parallel plate rotational rheometer (in this case an AntonPaar MCR300), with 25 mm diameter plates, at T=190° C. Samples were prepared in a melt-press at 200° C., under 200 bar pressure for 4 min, in a plate of thickness of approximately 1 mm and stamped out to 25 mm diameter discs, which were inserted in the rheometer. The measurement was done in dynamic oscillatory shear mode as a "frequency-sweep", measuring at frequencies from 620 to 0.02 rad/s, under constant strain-amplitude of 5% (in the linear rheological regime). The $t_{maxDSC}$ was determined using a Differential Scanning calorimetry apparatus, TA Instruments Q2000, under isothermal conditions at a constant temperature of 124° C. 5-6 mg of sample were weighed and brought into the aluminum DSC pans. The sample was heated with 20K/min up to 200° C. and cooled down also with 20K/min to the test temperature, thereby erasing the thermal history. The isothermal test began immediately after and the time was recorded until crystallization occurs. The time interval until the crystallization heat flow maximum (peak), $t_{maxDSC}$, was determined using the vendor software (TA Instruments). The measurement was repeated 3 times and an average value was then calculated (in min). If no crystallization was observed under these conditions for more than 120 minutes, the value of $t_{maxDSC}$=120 minutes was used for further calculations of the HMWcopo index.

The melt viscosity $\eta_{0.02}$ value was multiplied by the $t_{maxDSC}$ value and the product was normalized by a factor of 100000 ($10^5$).

Molecular Weight Distribution Determination

The determination of the molar mass distributions and the mean number average mol. weight Mn was carried out by high-temperature gel permeation chromatography using a method described in ISO 16014-1, -2, -4, issues of 2003. The weight-average mol. weight $M_w$ and the z-average $M_z$, as well as the $M_w/M_n$ derived where determined by the MALLS coupled to the GPC. Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used. The solvent was vacuum distilled under nitrogen and stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany)) in the range from 580 g/mol up to 11600000 g/mol and additionally with hexadecane. The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraße 36, D-55437 Ober-Hilbersheim, Germany) respectively.

Melt Flow Index

Determined according to ISO 1133 at 190° C. with the specified load.

Long Chain Branching Index (LCBI)

The LCBI corresponds to the branching factor g', measured for a molecular weight of $10^6$ g/mol. The branching factor g', which allows determining long-chain branches at high Mw, was measured by Gel Permeation Chromatography (GPC) coupled with Multi-Angle Laser-Light Scattering (MALLS). The radius of gyration for each fraction eluted from the GPC (with a flow-rate of 0.6 ml/min and a column packed with 30 µm particles) was measured by analyzing the light scattering at the different angles with the MALLS (detector Wyatt Dawn EOS, Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software.

The parameter g' is the ratio of the measured mean square radius of gyration to that of a linear polymer having the same molecular weight. Linear molecules show g' of 1, while values less than 1 indicate the presence of LCB. Values of g' as a function of mol. weight, M, were calculated from the equation:

$$g'(M) = <Rg^2>_{sample,M} / <Rg^2>_{linear\ ref,M}$$

where $<Rg^2>$, M is the root-mean-square radius of gyration for the fraction of mol. weight M.

The radius of gyration for each fraction eluted from the GPC (with a flow-rate of 0.6 ml/min and a column packed with 30 µm particles) was measured by analyzing the light scattering at the different angles. Mol. weight M and $<Rg^2>_{sample,M}$ were determined and g' was defined at a measured M=$10^6$ g/mol. The $<Rg^2>_{linear\ ref,M}$ was calculated by the established relation between radius-of-gyration and molecular weight for a linear polymer in solution (Zimm and Stockmayer WH 1949)) and confirmed by measuring a linear PE reference.

The same protocol is described in the following documents.

Zimm B H, Stockmayer W H (1949) *The dimensions of chain molecules containing branches and rings*. J Chem Phys 17 and Rubinstein M., Colby R H. (2003), *Polymer Physics*, Oxford University Press, both incorporated herein by reference.

Comonomer Content

The comonomer content was determined by IR in accordance with ASTM D 6248 98, using an FT-IR spectrometer Tensor 27 from Bruker, calibrated with a chemometric model for determining ethyl- or butyl-side-chains in PE for butene or hexene as comonomer, respectively. The result agreed with the estimated comonomer content derived from the mass-balance of the polymerization process.

Environmental Stress Cracking Resistance According to Full Notch Creep Test (FNCT)

The environmental stress cracking resistance of polymer samples was determined according to international standard ISO 16770 (FNCT) in aqueous surfactant solution. From the polymer sample a compression-molded 10 mm thick sheet was prepared. The bars with squared cross section (10×10× 100 mm) were notched using a razor blade on four sides perpendicularly to the stress direction. A notching device described in M. Fleissner in Kunststoffe 77 (1987), pp. 45 was used for the sharp notch with a depth of 1.6 mm. The load applied was calculated from tensile force divided by the initial ligament area. Ligament area was the remaining area=total cross-section area of specimen minus the notch area. For FNCT specimen: 10×10 mm$^2$–4 times of trapezoid notch area=46.24 mm$^2$ (the remaining cross-section for the failure process/crack propagation). The test specimen was loaded with standard condition suggested by the ISO 16770 with constant load of 5 MPa at 90° C. in an aqueous solution of 2% by weight of ARKOPAL N100 and 5% of anionic surfactant GENAPOL Paste. Time until rupture of test specimen was detected.

Charpy

Fracture toughness determination by an internal method on test bars measuring 10×10×80 mm which was sawed out of a compression molded sheet with a thickness of 10 mm. Six of these test bars were notched in the center using a razor blade in the notching device. The notch depth was 1.6 mm. The measurement was carried out according to the Charpy measurement method in accordance with ISO 179-1, with modified test specimens and modified impact geometry (distance between supports). Test specimens were conditioned to the measurement temperature of 0° C. over a period of from 2 to 3 hours. A test specimen was then placed without delay onto the support of a pendulum impact tester according to ISO 179-1. The distance between the supports was 60 mm. The drop of the 2 J hammer was triggered, with the drop angle being set to 160°, the pendulum length to 225 mm and the impact velocity to 2.93 m/s. The fracture toughness value was expressed in kJ/m$^2$ and given by the quotient of the impact energy consumed and the initial cross-sectional area at the notch, a FM. Values for complete fracture and hinge fracture were used (see suggestion by ISO 179-1).

Example 1

Process Setup

The polymerization process was carried out under continuous conditions in a plant including two serially connected gas-phase reactors, as shown in FIG. 1.

The solid catalyst component was prepared as follows.

Procedure for the Preparation of the Spherical Support (Adduct of MgCl$_2$/EtOH)

A magnesium chloride and alcohol adduct was prepared following the method described in Example 2 of U.S. Pat. No. 4,399,054 (incorporated herein by reference), but working at 2000 RPM instead of 10000 RPM. The adduct contained about 3 mols of alcohol and about 2.5% wt of H$_2$O and had an average size of about 55 μm. The adduct was subjected to a thermal treatment, under nitrogen stream, over a temperature range of 50-150° C. until a weight content of 25% of alcohol was reached.

Procedure for the Preparation of the Catalyst Component

Into a 2 L reaction vessel, purged with nitrogen, 1 L of TiCl$_4$ was introduced at 0° C. Then, at the same temperature, 70 grams of a spherical MgCl$_2$/EtOH adduct containing 25% wt of ethanol were added under stirring.

The temperature was raised to 130° C. in 2 hours and maintained for 60 min. Then, the stirring was discontinued, the solid product was allowed to settle (in 1 h at 130° C.) and the supernatant liquid was siphoned off. A volume of fresh TiCl$_4$ was introduced into the reactor to prepare 1 L of total slurry and the temperature was raised to 110° C. under stirring. This temperature was kept for 15' then the stirring was stopped and the solid was allowed to settle (in 1 h at 110° C.), and the supernatant liquid was siphoned off.

The solid residue was then washed two times with hexane at 50° C. and three times at 25° C. and dried under vacuum at 30° C. and analyzed.

The spherically shaped solid has a magnesium content of 19.0% wt, and an average particle size (P50) of 57 micron.

Propylene-Pre-Polymerization

Into a 1.5 L glass reactor provided with stirrer, 0.8 L of hexane at 20° C. and while stirring 47 g of the catalyst component were introduced at 10° C. Keeping constant the internal temperature, 14 g of tri-n-octylaluminum (TnOA) in hexane (about 370 g/l) were slowly introduced into the reactor and the temperature was kept at 10° C. After 3' minutes stirring, an amount of cyclohexylmethyldimethoxysilane (C donor) was introduced, thereby yielding a Al/(C donor) molar ratio of 6. After 10', 61 g of propylene were carefully introduced into the reactor at the same temperature in 6 hours keeping a constant flow. The consumption of propylene in the reactor was monitored and the polymerization was discontinued when a theoretical conversion of 1.3 g of polymer per g of catalyst was reached. The prepolymer particles were allowed to settle. The product was washed four times with hexane at a temperature of 20° C. (60 g/L) and dried under vacuum at 30° C.

Internal Electron Donor Support on the Prepolymerized Catalyst

About 42 g of the solid prepolymerized catalyst were charged in a glass reactor purged with nitrogen and slurried with 0.8 L of hexane at 50° C.

Then, Ethyl Acetate was carefully added dropwise (in 10') in such an amount to have a molar ratio of 1.7 between Mg of the prepolymerized catalyst and the organic Lewis base.

The slurry was kept under stirring for 2 h having 50° C. as internal temperature.

After that the stirring was stopped and the solid was allowed to settle. One single hexane wash was performed at room temperature before recovering and drying the final catalyst.

Polymerization 7.7 g/h of the solid catalyst were fed, using 5 kg/h of liquid propane, to a precontacting apparatus, in which triethylaluminum (TEA) as well as tetrahydrofuran (THF) were dosed. The weight ratio between aluminum alkyl and solid catalyst component was 3:1. The weight ratio between aluminum alkyl and THF was 150 g/g. The precontacting step was carried out under stirring at 50° C. with a total residence time of 60 minutes.

The catalyst entered the first gas-phase polymerization reactor 1 of FIG. 1 via line 10. In the first reactor ethylene was polymerized using $H_2$ as molecular weight regulator and in the presence of propane as inert diluent. 52.5 kg/h of ethylene and 300 g/h of hydrogen were fed to the first reactor via line 9. No comonomer was fed to the first reactor.

The polymerization was carried out at a temperature of 80° C. and at a pressure of 2.9 MPa. The polymer obtained in the first reactor was discontinuously discharged via line 11, separated from the gas into the gas/solid separator 12, and reintroduced into the second gas-phase reactor via line 14.

The polymer produced in the first reactor had a melt index MIE of about 80 g/10 min and a density of 0.969 $kg/dm^3$.

The second reactor was operated under polymerization conditions of about 80° C., and a pressure of 2.5 MPa. The riser has an internal diameter of 200 mm and a length of 19 m. The downcomer has a total length of 18 m, an upper part of 5 m with an internal diameter of 300 mm and a lower part of 13 m with an internal diameter of 150 mm. The second reactor was operated by establishing different conditions of monomers and hydrogen concentration within the riser 32 and the downcomer 33, thereby broadening the molecular weight distribution of the final ethylene polymer and using the conditions of feeding via line 52, 150 kg/h of a liquid stream (liquid barrier) into the upper part of the downcomer 33. The liquid stream had a composition different from that of the gas mixture present in the riser. The different concentrations of monomers and hydrogen within the riser, the downcomer of the second reactor and the composition of the liquid barrier are indicated in Table 1. The liquid stream of line 52 came from the condensation step in the condenser 49, at working conditions of 59° C. and 2.5 MPa, wherein a part of the recycle stream was cooled and partially condensed. As shown in the FIGURE, a separating vessel and a pump are placed, in the order, downstream the condenser 49. The monomers to the downcomer were fed in 3 positions (lines 46). In dosing point 1, located just below the barrier, 10 kg/h of ethylene and 2 kg/h of 1-hexene were introduced. In dosing point 2, located 2.3 meters below dosing point 1, 5 kg/h of ethylene were introduced. In dosing point 3, located 4 meters below dosing point 2, 5 kg/h of ethylene were introduced. In each of the 3 dosing points, a liquid taken from stream 52 was additionally fed in ratio to ethylene of 1:1.5 kg/h of propane, 21.5 kg/h of ethylene and 1.4 g/h of hydrogen were fed through line 45 into the recycling system.

The final polymer was discontinuously discharged via line 54.

The polymerization process in the second reactor produced relatively high molecular weight polyethylene fractions. In Table 1 the properties of the final product are specified.

The first reactor produced around 54% by weight (split wt %) of the total amount of the final polyethylene resin produced by both first and second reactors.

The comonomer (hexene-1) amount was about 2.2% by weight (as determined by IR).

Example 2

The polymerization process was carried out with the same setup, the same polymerization catalyst and under the same conditions as Example 1, except for the following:
Feeding of hexene to dosing point 1: 1.7 kg/h.
The hydrogen feed to line 45 was 2.5 g/h.

Example 3

The polymerization process was carried out with the same setup, the same polymerization catalyst and under the same conditions as Example 1, except for the following:
Catalyst feed was 8.5 g/h.
The weight ratio between aluminum alkyl and THF was 44 g/g.
48 kg/h of ethylene and 330 g/h of hydrogen were fed to the first reactor via line 9.
50 kg/h of liquid barrier were fed to the second reactor.
Feeding of hexene to dosing point 1: 1.55 kg/h.
21.9 kg/h of ethylene and 2.5 g/h of hydrogen were fed through line 45.
The split of the first reactor was around 52% by weight.

Example 4

The polymerization process was carried out with the same setup, the same polymerization catalyst and under the same conditions as Example 1, except for the following:
Catalyst feed was 8.4 g/h.
The weight ratio between aluminum alkyl and THF was 44 g/g.
48.4 kg/h of ethylene and 350 g/h of hydrogen were fed to the first reactor via line 9.
50 kg/h of liquid barrier were fed to the second reactor.
Feeding of hexene to dosing point 1: 1.8 kg/h.
21.9 kg/h of ethylene and 2.2 g/h of hydrogen were fed through line 45.
The split of the first reactor was around 52% by weight.

Example 5

The polymerization process was carried out with the same setup, the same polymerization catalyst and under the same conditions as Example 1, except for the following:
Catalyst feed was 8.9 g/h.
The weight ratio between aluminum alkyl and THF was 44 g/g.
50 kg/h of ethylene and 370 g/h of hydrogen were fed to the first reactor via line 9.
50 kg/h of liquid barrier were fed to the second reactor.
Feeding of hexene to dosing point 1: 1.5 kg/h.
21.5 kg/h of ethylene and 1.7 g/h of hydrogen were fed through line 45.
The split of the first reactor was around 53% by weight.

Example 6

The polymerization process was carried out with the same setup, the same polymerization catalyst and under the same conditions as Example 1, except for the following:
Catalyst feed was 9.2 g/h.
The weight ratio between aluminum alkyl and THF was 44 g/g.
52 kg/h of ethylene and 360 g/h of hydrogen were fed to the first reactor via line 9.
50 kg/h of liquid barrier were fed to the second reactor.
Feeding of hexene to dosing point 1: 1.53 kg/h.
21.5 kg/h of ethylene and 2.5 g/h of hydrogen were fed through line 45.
The split of the first reactor was around 54% by weight.

Comparative Example 1

The polymer of this comparative example was a polyethylene composition prepared with a Ziegler-Natta catalyst in a bimodal slurry process with 1-butene as comonomer. It is available on the market with the commercial name Alathon L5008 (Lyondell Basell).

TABLE 1

| Example No. | 1 | 2 | 3 |
|---|---|---|---|
| Operative conditions first reactor | | | |
| H$_2$/C$_2$H$_4$ Molar ratio | 2.4 | 2.3 | 2.5 |
| C$_2$H$_4$ % | 10.7 | 11.4 | 10.8 |
| MIE A) | 88 | 78 | 82 |
| Split (wt %) | 54 | 54 | 52 |
| Operative conditions second reactor | | | |
| H$_2$/C$_2$H$_4$ Molar ratio riser | 0.028 | 0.033 | 0.027 |
| C$_2$H$_4$ % riser | 7.2 | 7.8 | 8.4 |
| C$_6$H$_{12}$ % riser | 0.65 | 0.62 | 0.65 |
| H$_2$/C$_2$H$_4$ Molar ratio downcomer | 0.041 | 0.042 | 0.038 |
| C$_2$H$_4$ % downcomer | 3.2 | 3.8 | 5.2 |
| C$_6$H$_{12}$ % downcomer | 0.79 | 0.75 | 0.79 |
| H$_2$/C$_2$H$_4$ Molar ratio barrier | 0.006 | 0.006 | 0.007 |
| C$_2$H$_4$ % barrier | 4.7 | 4.9 | 5.6 |
| C$_6$H$_{12}$ % barrier | 0.93 | 0.86 | 0.85 |
| Polymer properties | | | |
| Density (A) [g/cm$^3$] | 0.969 | 0.969 | 0.969 |
| MIP final resin [g/10 min] | 0.39 | 0.41 | 0.33 |
| MIF final resin [g/10 min] | 13.8 | 13.6 | 9.43 |
| Density final resin [g/cm$^3$] | 0.951 | 0.951 | 0.950 |
| MIF/MIP final resin | 35.4 | 33.2 | 28.6 |
| HMWcopo | 14.7 | 13.8 | 15.4 |
| LCBI at 1,000,000 g/mol | 0.73 | 0.72 | 0.76 |
| Mw$_{MALLS}$/Mn$_{GPC}$ | 15.9 | 23.2 | 14.9 |
| Mw$_{MALLS}$ [g/mol] | 265.069 | 316.449 | 263.262 |
| Mz$_{MALLS}$ [g/mol] | 927.532 | 2.251.796 | 1.313.192 |
| FNCT 5 MPa/90° C. (hours) | 211 | 66 | 195 |
| Charpy aFM, T = 0° C. [kJ/m$^2$] | 10.5 | 10.0 | 12.9 |

| Example No. | 4 | 5 | 6 | Comp. 1 |
|---|---|---|---|---|
| Operative conditions first reactor | | | | |
| H$_2$/C$_2$H$_4$ Molar ratio | 2.5 | 2.5 | 2.5 | — |
| C$_2$H$_4$ % | 11 | 11.5 | 11.4 | — |
| MIE A) | 78 | 82 | 84 | — |
| Split (wt %) | 52 | 53 | 54 | — |
| Operative conditions second reactor | | | | |
| H$_2$/C$_2$H$_4$ Molar ratio riser | 0.026 | 0.021 | 0.031 | — |
| C$_2$H$_4$ % riser | 8.2 | 8.2 | 7.8 | — |
| C$_6$H$_{12}$ % riser | 0.73 | 0.64 | 0.63 | — |
| H$_2$/C$_2$H$_4$ Molar ratio downcomer | 0.036 | 0.032 | 0.051 | — |
| C$_2$H$_4$ % downcomer | 5 | 4.1 | 3.9 | — |
| C$_6$H$_{12}$ % downcomer | 0.88 | 0.76 | 0.76 | — |
| H$_2$/C$_2$H$_4$ Molar ratio barrier | 0.006 | 0.004 | 0.006 | — |
| C$_2$H$_4$ % barrier | 5.3 | 5.5 | 5.2 | — |
| C$_6$H$_{12}$ % barrier | 0.94 | 0.9 | 0.81 | — |
| Polymer properties | | | | |
| Density (A) [g/cm$^3$] | 0.969 | 0.969 | 0.969 | — |
| MIP final resin [g/10 min] | 0.32 | 0.31 | 0.48 | 0.34 |
| MIF final resin [g/10 min] | 9.36 | 9.99 | 14.6 | 15.09 |
| Density final resin [g/cm$^3$] | 0.950 | 0.950 | 0.951 | 0.950 |
| MIF/MIP final resin | 29.3 | 32.2 | 30.4 | 44.4 |
| HMWcopo | 16.4 | 16.6 | 10.9 | 71.5 |
| LCBI at 1,000,000 g/mol | 0.80 | 0.75 | 0.76 | 0.63 |
| Mw$_{MALLS}$/Mn$_{GPC}$ | 18.1 | 16.1 | 14.5 | 52.3 |
| Mw$_{MALLS}$ [g/mol] | 385.076 | 328036 | 289709 | 338.268 |
| Mz$_{MALLS}$ [g/mol] | 1.003.967 | 1316574 | 1170436 | 1.722.076 |
| FNCT 5 MPa/90° C. (hours) | 238 | 337 | 48 | 10.2 |
| Charpy aFM, T = 0° C. [kJ/m$^2$] | 13.2 | — | — | 6.6 |

Notes:
C$_2$H$_4$ = ethylene; C$_6$H$_{12}$ = hexene; ethylene and hexene amounts are in percent by moles;
Split = weight amount of polymer produced in the concerned reactor.

What is claimed is:

1. A polyethylene composition comprising:
an ethylene polymer, wherein the ethylene polymer has a melt flow index (MIE) of 50 to 110 g/10 min., measured at 190° C. with a load of 2.16 kg, and wherein the polyethylene composition has:
1) a density from about 0.945 to about 0.955 g/cm$^3$, determined according to ISO 1183 at 23° C.;
2) a ratio MIF/MIP from about 23 to about 40, where MIF is the melt flow index at 190° C. with a load of 21.60 kg, and MIP is the melt flow index at 190° C. with a load of 5 kg, both determined according to ISO 1133;
3) a MIF from about 8.5 to about 18 g/10 min.;
4) a HMWcopo index from about 3.5 to about 20; and
5) a long-chain branching index, LCBI, equal to or greater than about 0.45;
wherein the HMWcopo index is determined according to the following formula:

$$HMWcopo = (\eta_{0.02} \times t_{maxDSC})/(10^5)$$

where
$\eta_{0.02}$ is the complex viscosity of a melt in Pa·s, measured at a temperature of 190° C., in a parallel-plate rheometer under dynamic oscillatory shear mode with an applied angular frequency of 0.02 rad/s;
(ii) $t_{maxDSC}$ is the time in minutes to reach the maximum value of heat flow of crystallization at a temperature of 124° C. under quiescent conditions, measured in isothermal mode in a differential scanning calorimetry apparatus; and
(iii) LCBI is the ratio of the measured mean-square radius of gyration $R_g$, measured by GPC-MALLS, to the mean-square radius of gyration for a linear PE having a molecular weight equal to about the molecular weight of the polyethylene composition.

2. The polyethylene composition of claim 1, wherein the ethylene polymer is an ethylene copolymer.

3. The polyethylene composition of claim 1, wherein the ethylene polymer was prepared in the presence of a catalyst and the catalyst was a Ziegler-Natta polymerization catalyst.

4. The polyethylene composition of claim 3, wherein the Ziegler-Natta polymerization catalyst comprises a product of a reaction of:
a) a solid catalyst component comprising a Ti compound supported on MgCl$_2$, the solid catalyst component being obtained by
(i) contacting the titanium compound with the MgCl$_2$, or a precursor Mg compound, optionally in the presence of an inert medium, thereby obtaining an intermediate product a'), and (ii) subjecting a') to prepolymerization and contact with an electron donor compound;
b) an organo-Al compound; and optionally
c) an external electron donor compound.

5. The polyethylene composition of claim 1, wherein the polyethylene composition has at least one of the following features:
   a z-average molecular weight Mz equal from about 800,000 to about 3,500,000 g/mol, measured by GPC-MALLS (Gel Permeation Chromatography coupled with Multi-angle laser-light scattering);
   a $M_{w\_MALLS}/M_{n\_GPC}$ values from about 8 to about 18; and
   a comonomer content equal to or less than about 2.5% by weight, with respect to the total weight of the composition.

6. The polyethylene composition of claim 1, wherein
   A) about 30 to about 70% by weight of the polyethylene composition is the ethylene polymer being an ethylene homopolymer or copolymer with density equal to or greater than about 0.960 g/cm$^3$;
   B) about 30 to about 70% by weight of the polyethylene composition is a second ethylene polymer being an ethylene copolymer having a MIE value lower than the MIE value of A).

7. An article of manufacture comprising:
   a polyethylene composition comprising
      an ethylene polymer, wherein the ethylene polymer has a melt flow index (MIE) of 50 to 110 g/10 min., measured at 190° C. with a load of 2.16 kg, and wherein the polyethylene composition has:
         1) a density from about 0.945 to about 0.955 g/cm$^3$, determined according to ISO 1183 at 23° C.;
         2) a ratio MIF/MIP from about 23 to about 40, where MIF is the melt flow index at 190° C. with a load of 21.60 kg, and MIP is the melt flow index at 190° C. with a load of 5 kg, both determined according to ISO 1133;
         3) a MIF from about 8.5 to about 18 g/10 min.;
         4) a HMWcopo index from about 3.5 to about 20; and
         5) a long-chain branching index, LCBI, equal to or greater than about 0.45;
         wherein the HMWcopo index is determined according to the following formula:

$$HMWcopo = (\eta_{0.02} \times t_{maxDSC})/(10^5)$$

where
   (i) $\eta_{0.02}$ is the complex viscosity of a melt in Pa·s, measured at a temperature of 190° C., in a parallel-plate rheometer under dynamic oscillatory shear mode with an applied angular frequency of 0.02 rad/s;
   (ii) $t_{maxDSC}$ is the time in minutes to reach the maximum value of heat flow of crystallization at a temperature of 124° C. under quiescent conditions, measured in isothermal mode in a differential scanning calorimetry apparatus; and
   (iii) LCBI is the ratio of the measured mean-square radius of gyration $R_g$, measured by GPC-MALLS, to the mean-square radius of gyration for a linear PE having a molecular weight equal to about the molecular weight of the polyethylene composition.

8. The article of manufacture according to claim 7, being selected from the group consisting of monolayer pipes, multilayer pipes, monolayer films, and multilayer films, wherein a layer comprises the polyethylene composition.

9. A process for preparing a polyethylene composition comprising:
   polymerization steps carried out in the presence of a Ziegler-Natta polymerization catalyst supported on MgCl$_2$, wherein
   the polyethylene composition comprises
      an ethylene polymer, wherein the ethylene polymer has a melt flow index (MIE) of 50 to 110 g/10 min., measured at 190° C. with a load of 2.16 kg, and wherein the polyethylene composition has:
         1) a density from about 0.945 to about 0.955 g/cm$^3$, determined according to ISO 1183 at 23° C.;
         2) a ratio MIF/MIP from about 23 to about 40, where MIF is the melt flow index at 190° C. with a load of 21.60 kg, and MIP is the melt flow index at 190° C. with a load of 5 kg, both determined according to ISO 1133;
         3) a MIF from about 8.5 to about 18 g/10 min.;
         4) a HMWcopo index from about 3.5 to about 20; and
         5) a long-chain branching index, LCBI, equal to or greater than about 0.45;
         wherein the HMWcopo index is determined according to the following formula:

$$HMWcopo = (\eta_{0.02} \times t_{maxDSC})/(10^5)$$

where
   (i) $\eta_{0.02}$ is the complex viscosity of a melt in Pa·s, measured at a temperature of 190° C., in a parallel-plate rheometer under dynamic oscillatory shear mode with an applied angular frequency of 0.02 rad/s;
   (ii) $t_{maxDSC}$ is the time in minutes to reach the maximum value of heat flow of crystallization at a temperature of 124° C. under quiescent conditions, measured in isothermal mode in a differential scanning calorimetry apparatus; and
   (iii) LCBI is the ratio of the measured mean-square radius of gyration $R_g$, measured by GPC-MALLS, to the mean-square radius of gyration for a linear PE having a molecular weight equal to about the molecular weight of the polyethylene composition.

10. The process for preparing a polyethylene composition of claim 9, wherein the polymerization steps include the following steps, in any mutual order:
   a) polymerizing ethylene, optionally together with one or more comonomers, in a first gas-phase reactor in the presence of a first amount of hydrogen;
   b) copolymerizing ethylene with one or more comonomers in a second gas-phase reactor in the presence of a second amount of hydrogen less than the first amount of hydrogen in step a);
wherein in at least one of the gas-phase reactors, the growing polymer particles flow upward through a first polymerization zone under fast fluidization or transport conditions, leave the riser and enter a second polymerization zone through which the polymer particles flow downward under the action of gravity, leave the second polymerization zone and are reintroduced into the first polymerization zone, thereby establishing a circulation of polymer between the two polymerization zones.

* * * * *